United States Patent
Lim et al.

(10) Patent No.: US 10,607,317 B2
(45) Date of Patent: Mar. 31, 2020

(54) APPARATUS AND METHOD OF REMOVING NOISE FROM SPARSE DEPTH MAP

(71) Applicant: Electronics and Telecommunications Research Institute, Daejeon (KR)

(72) Inventors: Han Shin Lim, Daejeon (KR); Ik Soon Kim, Daejeon (KR); Hae Dong Kim, Daejeon (KR); Seong Won Ryu, Daejeon (KR); Chan Ho Park, Daejeon (KR); Jun Suk Lee, Daejeon (KR); Kyung Ho Jang, Daejeon (KR); Jae Pil Heo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 49 days.

(21) Appl. No.: 15/805,370

(22) Filed: Nov. 7, 2017

(65) Prior Publication Data
US 2018/0130185 A1 May 10, 2018

(30) Foreign Application Priority Data
Nov. 9, 2016 (KR) .................. 10-2016-0148966

(51) Int. Cl.
*G06T 5/00* (2006.01)
*G06T 5/50* (2006.01)
(Continued)

(52) U.S. Cl.
CPC ............ *G06T 5/002* (2013.01); *G06T 5/50* (2013.01); *G06T 17/20* (2013.01);
(Continued)

(58) Field of Classification Search
CPC ........... G06T 5/002; G06T 5/50; G06T 17/20; G06T 2207/10024; G06T 2200/04; G06T 2207/10028; G06T 7/90
See application file for complete search history.

(56) References Cited

U.S. PATENT DOCUMENTS 7,586,489 B2 * 9/2009 Muller-Fischer ....... G06T 17/20
345/419
2009/0174710 A1 7/2009 Sim et al.
(Continued)

FOREIGN PATENT DOCUMENTS

KR 10-1999-0081321 11/1999
KR 10-2009-0076412 7/2009
(Continued)

OTHER PUBLICATIONS

Jae-Young Han et al.; "GPGPU based Depth Image Enhancement Algorithm"; JKIICE, Journal of the Korea Institute of Information and Communication Engineering, vol. 17, No. 12; Dec. 2013; pp. 2927-2936.
(Continued)

*Primary Examiner* — Maurice L. McDowell, Jr.
*Assistant Examiner* — Donna J. Ricks
(74) *Attorney, Agent, or Firm* — Kile Park Reed & Houtteman PLLC

(57) ABSTRACT

Provided is a method of removing noise from a sparse depth map. The method includes setting, as nodes, sample points in a sparse depth map including depth information at a certain position of an image plane, constructing a mesh by connecting the set nodes, and removing noise from the meshed node, based on connection information between the meshed node and neighboring nodes adjacent thereto and
(Continued)

color information about a color image corresponding to the sparse depth map. A depth value is allocated to each of the sample points.

13 Claims, 2 Drawing Sheets

(51) Int. Cl.
  *G06T 17/20* (2006.01)
  *G06T 7/90* (2017.01)
(52) U.S. Cl.
  CPC ............... *G06T 2200/04* (2013.01); *G06T 2207/10024* (2013.01); *G06T 2207/10028* (2013.01)

(56) References Cited

U.S. PATENT DOCUMENTS

| | | | |
|---|---|---|---|
| 2010/0066811 A1 | 3/2010 | Chang et al. |
| 2010/0183236 A1 | 7/2010 | Kang et al. |
| 2010/0328307 A1 | 12/2010 | Lim |
| 2011/0043610 A1 | 2/2011 | Ren et al. |
| 2011/0148868 A1 | 6/2011 | Chang et al. |
| 2012/0280996 A1 | 11/2012 | Kannan et al. |
| 2014/0104397 A1 | 4/2014 | Shin et al. |
| 2014/0185921 A1 | 7/2014 | Choi et al. |
| 2014/0218467 A1 | 8/2014 | You et al. |
| 2014/0241644 A1 | 8/2014 | Kang et al. |
| 2015/0029312 A1* | 1/2015 | Paik ............... H04N 5/2254 348/46 |
| 2016/0071324 A1 | 3/2016 | Reddy et al. |
| 2017/0171525 A1* | 6/2017 | Koehle ............ H04N 13/239 |
| 2018/0096463 A1* | 4/2018 | Kim ................ G06T 5/002 |

FOREIGN PATENT DOCUMENTS

| | | |
|---|---|---|
| KR | 10-2010-0085675 | 7/2010 |
| KR | 10-2012-0101974 | 9/2012 |
| KR | 10-2014-0048689 | 4/2014 |
| KR | 10-2014-0064090 | 5/2014 |
| KR | 10-2014-0088697 | 7/2014 |
| WO | 2006/049384 | 5/2006 |
| WO | 2014/105542 | 7/2014 |

OTHER PUBLICATIONS

Johannes Kopf et al., "Joint Bilateral Upsamping"; ACM Transactions on Graphics (Proceedings of SIGGRAPH 2007), vol. 26 Issue 3, Jul. 2007, Article No. 96, ACM New York, NY, USA.

* cited by examiner

APPARATUS AND METHOD OF REMOVING NOISE FROM SPARSE DEPTH MAP

CROSS-REFERENCE TO RELATED APPLICATIONS

This application claims priority under 35 U.S.C. § 119 to Korean Patent Application No. 2016-0148966, filed on Nov. 9, 2016, the disclosure of which is incorporated herein by reference in its entirety.

TECHNICAL FIELD

The present invention relates to an apparatus and method of removing noise from a sparse depth map.

BACKGROUND

Recently, three-dimensional (3D) structure reconstruction, virtual reality (VR), 3D printers, and 3D display technology are being actively developed. Such technologies are based on accurately obtaining depth information, and to this end, various pieces of equipment have been developed and released in the market.

However, in a case of obtaining depth information from various depth sensors or image information, in terms of a corresponding color image, a resolution is low, or there is much noise generally.

If the quality of the depth information is not good, results of various technologies using the depth information are adversely affected, and thus, an operation of removing noise from an initially obtained depth map having a low resolution and low quality is needed.

Moreover, since the depth information has characteristic where a depth continuation region and a depth discontinuation region are relatively clearly differentiated from each other, an operation of removing noise needs consideration of the depth information.

In this context, Korean Patent Registration No. 10-1526866 (title of invention: apparatus and method of filtering out depth noise by using depth information) discloses details for performing spatially filtering or temporally filtering according to depth information.

SUMMARY

Accordingly, the present invention provides an apparatus and a method, which construct a mesh having positions of points, having depth information, as nodes in a sparse depth map including the depth information at some positions of an image plane and remove noise of depth values in the sparse depth map by using mesh information and color information about an image.

The objects of the present invention are not limited to the aforesaid, but other objects not described herein will be clearly understood by those skilled in the art from descriptions below.

In one general aspect, a method of removing noise from a sparse depth map includes setting, as nodes, sample points in a sparse depth map including depth information at a certain position of an image plane, constructing a mesh by connecting the set nodes, and removing noise from the meshed node, based on connection information between the meshed node and neighboring nodes adjacent thereto and color information about a color image corresponding to the sparse depth map, wherein a depth value is allocated to each of the sample points.

In another general aspect, an apparatus for removing noise from a sparse depth map includes a communication module receiving depth information including a sparse depth map and a color image corresponding thereto, a memory storing a program for removing noise included in the sparse depth map, and a processor executing the program stored in the memory, wherein by executing the program, the processor sets sample points, to which depth values are respectively allocated, as nodes in the sparse depth map, connects the set nodes to construct a mesh, and removes noise from the meshed node, based on connection information between the meshed node and neighboring nodes adjacent thereto and color information about a color image corresponding to the sparse depth map.

Other features and aspects will be apparent from the following detailed description, the drawings, and the claims.

DETAILED DESCRIPTION OF EMBODIMENTS

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity.

In this disclosure below, when it is described that one comprises (or includes or has) some elements, it should be understood that it may comprise (or include or has) only those elements, or it may comprise (or include or have) other elements as well as those elements if there is no specific limitation.

The present invention relates to an apparatus 100 and method of removing noise from a sparse depth map.

According to an embodiment of the present invention, the apparatus 100 constructs a mesh having positions of points, having depth information, as nodes in a sparse depth map including the depth information at some positions of an image plane and removes noise of depth values in the sparse depth map by using mesh information and color information of the corresponding color image.

Hereinafter, a noise removing apparatus 100 according to an embodiment of the present invention will be described in detail with reference to FIG. 1.

Figure 1:
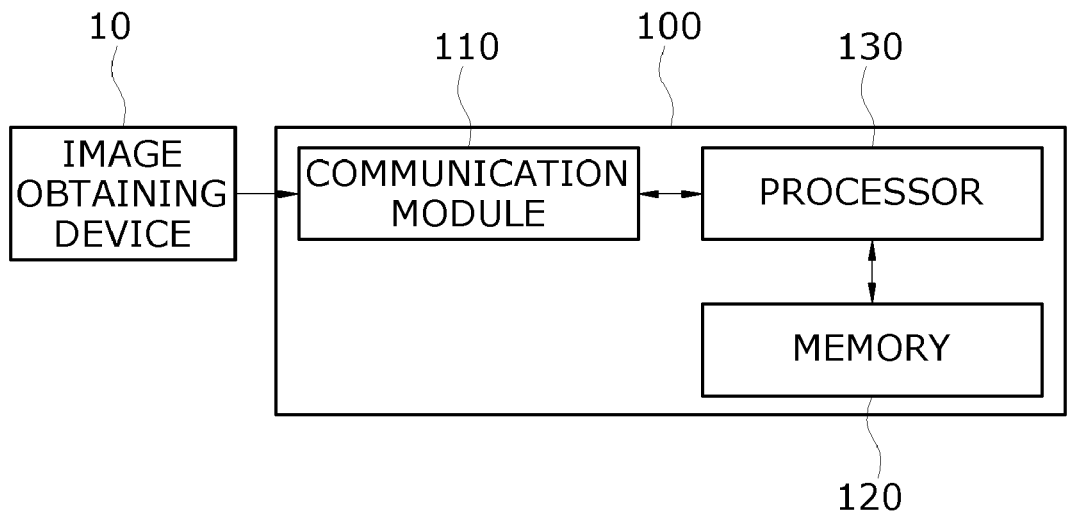
FIG. 1 is a block diagram of a noise removing apparatus according to an embodiment of the present invention.

FIG. 1 is a block diagram of a noise removing apparatus 100 according to an embodiment of the present invention.

The noise removing apparatus 100 according to an embodiment of the present invention may include a communication module 110, a memory 120, and a processor 130.

The communication module 110 may receive a depth image including a sparse depth map and a color image corresponding thereto from an image obtaining device 10.

The communication module 110 may include a wired communication module and a wireless communication module. The wired communication module may be implemented with a power cable communication device, a telephone cable communication device, cable home (MoCA), Ethernet, IEEE1294, an integrated cable home network, an RS-485 control device, and/or the like. Also, the wireless communication module may be implemented with wireless LAN (WLAN), Bluetooth, HDR WPAN, UWB, ZigBee, Impulse Radio, 60 GHz WPAN, Binary-CDMA, wireless USB technology, wireless HDMI technology, and/or the like.

A program for removing noise included in a sparse depth map may be stored in the memory 120. In this case, the memory 120 is a generic name for a volatile memory device and a non-volatile memory device which continuously maintains information stored therein even when power is not supplied thereto.

For example, examples of the memory 120 may include NAND flash memory such as compact flash (CF) card, secure digital (SD) card, memory stick, solid-state drive (SSD), and micro SD card, magnetic computer memory device such as hard disk drive (HDD), and optical disc drive such as CD-ROM and DVD-ROM.

The processor 130 may execute the program stored in the memory 120, and by executing the program, the processor 130 may remove noise from a sparse depth map.

For reference, the elements according to an embodiment of the present invention illustrated in FIG. 1 may each be implemented as a hardware type such as a field programmable gate array (FPGA) or an application specific integrated circuit (ASIC) and may perform certain functions.

However, "elements" are not meanings limited to software or hardware, and each element may be configured to reside in an addressable storage medium and configured to execute on one or more processors.

Thus, an element may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and modules may be combined into fewer components and modules or further separated into additional components and modules.

Hereinafter, a method, performed by the noise removing apparatus 100 according to an embodiment of the present invention, of removing noise from a sparse depth map will be described in detail with reference to FIGS. 2 to 4.

Figure 2:
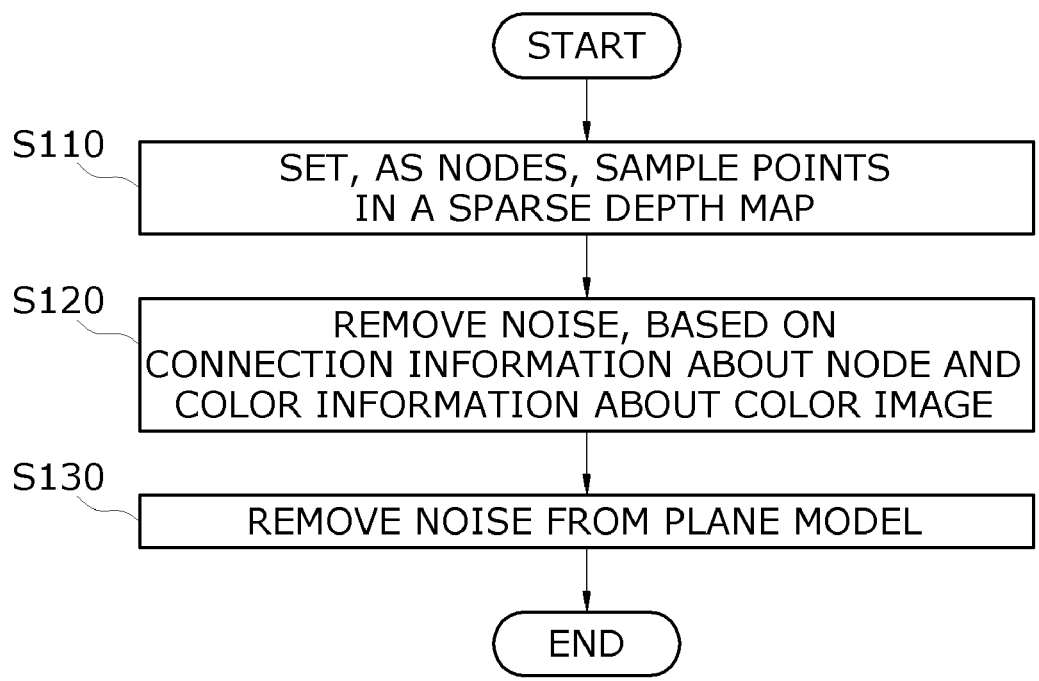
FIG. 2 is a flowchart of a noise removing method according to an embodiment of the present invention.

FIG. 2 is a flowchart of a noise removing method according to an embodiment of the present invention. FIG. 3 is an exemplary diagram of a mesh having a sample point of a sparse depth map as a node. FIG. 4 is a diagram for describing a noise removing operation.

First, in step S110, the noise removing method according to an embodiment of the present invention may set, as nodes, sample points in a sparse depth map located at a certain position of an image plane and may construct a mesh by connecting the set nodes. In this case, the sparse depth map may include depth information, and a depth value may be allocated to each of the sample points.

Figure 3:
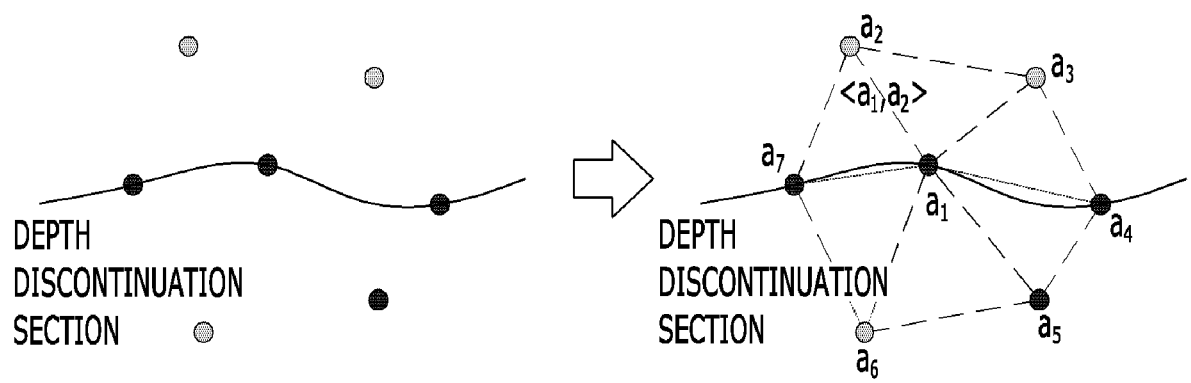
FIG. 3 is an exemplary diagram of a mesh having a sample point of a sparse depth map as a node.

Referring to FIG. 3, each of the sample points may be marked as a node and the nodes may be connected to each other for constructing the mesh. For example, nodes a2 to a7 located near a node a1 may be connected to the node a1. After the mesh is constructed, an edge connecting two nodes ai and aj may be expressed as <ai, aj>.

Subsequently, in step S120, noise of the node ai may be removed based on connection information about the node ai and color information about a color image. That is, the noise of the node ai may be removed based on the connection information between the node ai and neighboring nodes aj and ak adjacent thereto and the color information about the color image corresponding to the sparse depth map.

In detail, an operation of removing the noise from the node ai may generate a set Gi of nodes based on the connection information about the meshed node ai, among neighboring nodes.

In order to generate the set Gi of the nodes based on the connection information about the meshed node ai, differences between an initial depth value di of the node ai and initial depth values dk of neighboring nodes ak adjacent thereto may be calculated. Also, a mean value of absolute values of the differences between the initial depth value di of the node ai and the initial depth values dk of the neighboring nodes ak adjacent thereto may be calculated.

Subsequently, neighboring nodes where a difference between initial depth values is less than a mean value of absolute values may be extracted from among neighboring nodes and may be generated as the set Gi along with the node ai.

That is, the set Gi of the nodes may be expressed as the following Equation (1):

$$G_i = \{a_i\} \cup \{a_j | d_i - d_j| \leq \text{Mean}(|d_i - d_k|) \text{ for all } a_j \text{ and } a_k \text{ connected to } a_i\} \quad (1)$$

where di denotes an initial depth value in the meshed node ai, and Mean(|di−dk|) denotes a mean value of absolute values of differences between an initial depth value di of the node ai and initial depth values dk of the neighboring nodes ak.

As described above, when the set Gi of the nodes based on the connection information about the node ai is generated, a depth value of the node ai may subsequently be filtered based on color information and distance information about each of nodes included in the generated set Gi.

To this end, a distance between the node ai and each of neighboring nodes adjacent thereto among the nodes included in the generated set Gi may be calculated.

Furthermore, differences of color values between blocks corresponding to the meshed node ai and the neighboring nodes adjacent thereto may be calculated, and then, absolute values of the differences of the color values may be calculated and summated.

Subsequently, a depth value of the node ai may be filtered based on the calculated distance and a result value of the summation.

A depth value d'i obtained through the filtering may be expressed as the following Equation (2):

$$d'_i = \frac{\sum\limits_{a_j \in G_i} w_j d_j}{\sum\limits_{a_j \in G_i} w_j} \quad (2)$$

where Wj denotes s(∥ai−aj∥)c(SAD(BLi, BLj)), and SAD(BLi, BLj) denotes a sum of absolute values of differences between color values of two blocks BLi and BLj. Also, s(x) denotes a function for a distance between nodes in a space, and the following Equation (3) is an example of s(x). Also, c(y) denotes a function for a range of a color value between the nodes in the space, and the following Equation (4) is an example of c(y).

$$s(x) = \frac{\exp\left(\frac{-x^2}{2\sigma_s^2}\right)}{\sqrt{2\pi}\,\sigma_s} \quad (3)$$

$$c(x) = \frac{\exp\left(\frac{-x^2}{2\sigma_c^2}\right)}{\sqrt{2\pi}\,\sigma_c} \quad (4)$$

An operation of removing noise from the meshed node ai may be repeated while a predetermined specific reference is satisfied. In this case, for example, the predetermined specific reference may denote a case where a previous mean value and a current mean value of absolute values of differences between depth values in all edges corresponding to the meshed node ai are equal to or less than a predetermined threshold value and may be expressed as the following Equation (5):

$$\frac{||\text{Mean}_{current}|\langle a_i, a_j\rangle| - \text{Mean}_{prev}|\langle a_i, a_j\rangle||}{\text{Mean}_{current}|\langle a_i, a_j\rangle|} \leq thres \quad (5)$$

where $\text{Mean}_{prev}|\langle a_i, a_j\rangle|$ and $\text{Mean}_{current}|\langle a_i, a_j\rangle|$ denote the previous mean value and the current mean value of the absolute values of the differences between the depth values in all of the edges corresponding to the meshed node ai, respectively.

In this manner, when noise is removed from the meshed node ai and a depth value di' is obtained through primarily filtering, connection information may be updated based on the depth value di' subsequently, and noise of a sparse depth map may be removed based on the updated connection information and a plane model of an image plane in step S130.

In detail, an operation of updating the connection information based on the depth value di' may calculate differences between the depth value di' of each node ai and depth values dk' of connected nodes ak obtained through filtering and may calculate a mean value "Mean ($|d_t' - d_k'|$)" of absolute values of differences between the depth values.

Subsequently, nodes where a difference between depth values is less than a difference between mean values of absolute values may be extracted and may be generated as a set Gi' through updating along with the meshed node ai.

In this manner, when the set Gi' in which the updated connection information is reflected is generated, a plane model of the meshed node ai may be generated based on a pixel position value and filtered depth values of nodes included in the updated set Gi', and a depth value di" from which noise has been removed may be calculated based on the plane model as expressed in the following Equation (6):

$$d_i'' = \alpha x_i + \beta y_i + \gamma \quad (6)$$

Figure 4:
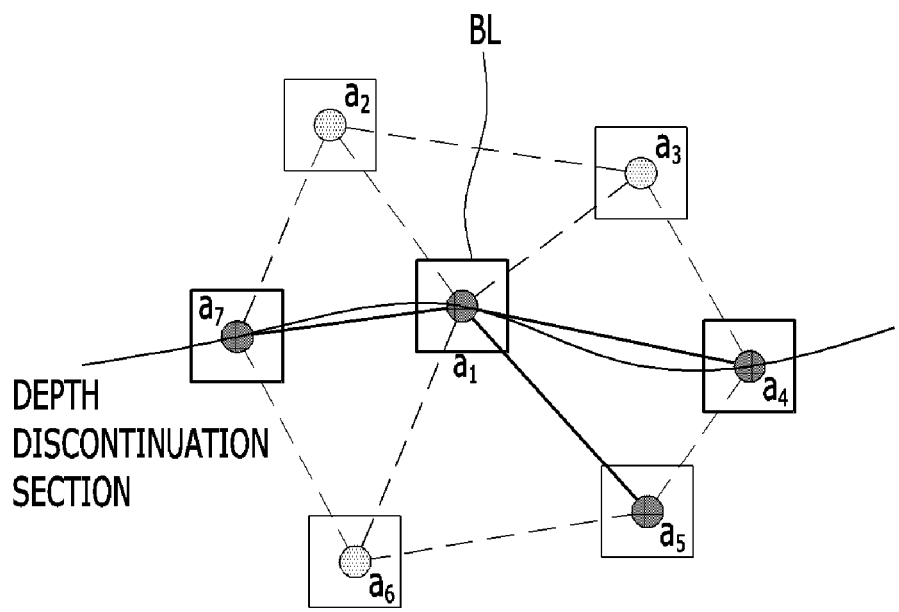
FIG. 4 is a diagram for describing a noise removing operation.

The plane model may be generated by calculating parameters "$\alpha, \beta, \gamma$" of a plane equation as expressed in the following Equation (7):

$$\begin{bmatrix} x_i & y_i & 1 \\ x_j & y_j & 1 \\ \vdots & \vdots & \vdots \\ x_k & y_k & 1 \end{bmatrix} \begin{bmatrix} \alpha \\ \beta \\ \gamma \end{bmatrix} = \begin{bmatrix} d_i' \\ d_j' \\ \vdots \\ d_k' \end{bmatrix} \quad (7)$$

where aj, . . . , ak∈Gi' is satisfied, and (xi, yi) denotes coordinates of the meshed node ai in an image, For example, as illustrated in FIG. 4, when a set G1 of meshed nodes a1 is {a1, a4, a5, a7} (i.e., G1={a1, a4, a5, a7}), a result obtained by removing noise based on the plane model may be expressed as the following Equation (8):

$$\begin{bmatrix} x_1 & y_1 & 1 \\ x_4 & y_4 & 1 \\ x_5 & y_5 & 1 \\ x_7 & y_7 & 1 \end{bmatrix} \begin{bmatrix} \alpha \\ \beta \\ \gamma \end{bmatrix} = \begin{bmatrix} d_1' \\ d_4' \\ d_5' \\ d_7' \end{bmatrix} \quad (8)$$

In the above description, steps S110 to S130 may be further divided into additional steps or may be simplified into fewer steps depending on an implementation of the present invention. Also, some steps may be omitted depending on the case, and an order of steps may be changed. Furthermore, although omitted, details described above with reference to FIG. 1 may be applied to the noise removing method illustrated in FIGS. 2 to 4.

The noise removing apparatus 100 according to an embodiment of the present invention may be implemented in the form of a storage medium that includes computer executable instructions, such as program modules, being executed by a computer. Computer-readable media may be any available media that may be accessed by the computer and includes both volatile and nonvolatile media, removable and non-removable media. In addition, the computer-readable media may include computer storage media and communication media. Computer storage media includes both the volatile and non-volatile, removable and non-removable media implemented as any method or technology for storage of information such as computer readable instructions, data structures, program modules, or other data. The medium of communication is a typically computer-readable instruction, and other data in a modulated data signal such as data structures, or program modules, or other transport mechanism and includes any information delivery media.

The method and apparatus according to the embodiments of the present invention have been described in association with a specific embodiment, but their elements, some operations, or all operations may be implemented by using a computer system having general-use hardware architecture.

The foregoing description of the present invention is for illustrative purposes, those with ordinary skill in the technical field of the present invention pertains in other specific forms without changing the technical idea or essential features of the present invention that may be modified to be able to understand. Therefore, the embodiments described above, exemplary in all respects and must understand that it is not limited. For example, each component may be distributed and carried out has been described as a monolithic and describes the components that are to be equally distributed in combined form, may be carried out.

As described above, according to one of the embodiments of the present invention, the clarity of a depth continuation region and a depth discontinuation region which are features of a depth image is maintained, and moreover, noise is more accurately removed from a sparse depth map than the related art.

Moreover, according to one of the embodiments of the present invention, since a case where characteristics of patterns or positions of sample points in a sparse depth map differ is not limited, the present invention may be applied to sparse depth maps obtained from various methods and apparatuses 100.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of removing noise from a sparse depth map, the method comprising:
 setting, as nodes, sample points in a sparse depth map including depth information at a certain position of an image plane;
 constructing a mesh by connecting the set nodes; and
 removing noise from the meshed node, based on connection information between the meshed node and neighboring nodes adjacent thereto and color information about a color image corresponding to the sparse depth map,
 wherein a depth value is allocated to each of the sample points;
 wherein the removing of the noise comprises:
  generating a set of nodes, matching the connection information about the meshed node, among the neighboring nodes; and
  filtering a depth value of the meshed node, based on the color information and distance information about each of the nodes included in the generated set; and
 wherein the generating of the set of the nodes comprises:
  calculating differences between an initial depth value di of the meshed node and initial depth values of the neighboring nodes adjacent thereto;
  calculating a mean value of absolute values of the differences between the initial depth value of the meshed node and the initial depth values of the neighboring nodes adjacent thereto; and
  extracting neighboring nodes, where a difference between the initial depth values is less than the mean value of the absolute values may be extracted from among the neighboring nodes, and generating the set along with the meshed node.

2. The method of claim 1, wherein the filtering of the depth value of the meshed node comprises:
 calculating a distance between the meshed node and each of neighboring nodes adjacent thereto among the nodes included in the generated set;
 calculating differences of color values between blocks corresponding to the meshed node and the neighboring nodes adjacent thereto;
 summating absolute values of the differences of the color values; and
 filtering a depth value of the meshed node, based on the calculated distance and a result value of the summation.

3. The method of claim 1, wherein when a previous mean value and a current mean value of absolute values of differences between depth values in all edges corresponding to the meshed node are equal to or less than a predetermined threshold value, the removing of the noise is repeated by using the filtered depth value as an initial depth value.

4. The method of claim 1, further comprising:
 updating connection information, based on the filtered depth value; and
 removing the noise from the sparse depth map, based on the updated connection information and a plane model of the image plane.

5. The method of claim 4, wherein the updating of the connection information comprises:
 calculating differences between the filtered depth value of the meshed node and filtered depth values of the nodes included in the set;
 calculating a mean value of absolute values of the depth values; and
 extracting nodes where a difference between the depth values is less than a difference between mean values of the absolute values, and generating a set of the extracted nodes through updating along with the meshed node.

6. The method of claim 5, wherein the removing of the noise from the sparse depth map comprises:
 generating a plane model of the meshed node, based on a pixel position value and filtered depth values of the nodes included in the set generated through the updating; and
 calculating a depth value from which noise has been removed, based on the plane model.

7. The method of claim 6, wherein the generating of the plane model comprises calculating a parameter of a plane equation and generating the plane model, based on the parameter.

8. An apparatus for removing noise from a sparse depth map, the apparatus comprising:
 a communication device receiving depth information including a sparse depth map and a color image corresponding thereto;
 a memory storing a program that removes noise included in the sparse depth map; and
 a processor executing the program stored in the memory,
 wherein by executing the program, the processor sets sample points, to which depth values are respectively allocated, as nodes in the sparse depth map, connects the set nodes to construct a mesh, and removes noise from the meshed node, based on connection information between the meshed node and neighboring nodes adjacent thereto and color information about a color image corresponding to the sparse depth map;
 wherein the processor generates a set of nodes, matching the connection information about the meshed node, among the neighboring nodes and filters a depth value of the meshed node, based on the color information and distance information about each of the nodes included in the generated set; and
 wherein the processor calculates differences between an initial depth value di of the meshed node and initial depth values of the neighboring nodes adjacent thereto, calculates a mean value of absolute values of the differences between the initial depth value of the meshed node and the initial depth values of the neighboring nodes adjacent thereto, and extracts neighboring nodes, where a difference between the initial depth values is less than the mean value of the absolute values may be extracted from among the neighboring nodes, and generating the set along with the meshed node.

9. The apparatus of claim 8, wherein the processor calculates a distance between the meshed node and each of neighboring nodes adjacent thereto among the nodes included in the generated set, calculates differences of color values between blocks corresponding to the meshed node and the neighboring nodes adjacent thereto, summates absolute values of the differences of the color values, and filters a depth value of the meshed node, based on the calculated distance and a result value of the summation.

10. The apparatus of claim 8, wherein when a previous mean value and a current mean value of absolute values of differences between depth values in all edges corresponding to the meshed node are equal to or less than a predetermined threshold value, the processor repeatedly filters the depth value by using the filtered depth value as an initial depth value.

11. The apparatus of claim 8, wherein the processor updates connection information, based on the filtered depth value and removes the noise from the sparse depth map, based on the updated connection information and a plane model of the image plane.

12. The apparatus of claim 11, wherein the processor calculates differences between the filtered depth value of the meshed node and filtered depth values of the nodes included in the set, calculates a mean value of absolute values of the depth values, extracts nodes where a difference between the depth values is less than a difference between mean values of the absolute values, and generates a set of the extracted nodes through updating along with the meshed node.

13. The apparatus of claim 12, wherein the processor generates a plane model of the meshed node, based on a pixel position value and filtered depth values of the nodes included in the set generated through the updating and calculates a depth value from which noise has been removed, based on the plane model.

* * * * *